March 15, 1932.  E. A. BRADEN  1,849,359
SELF CONTAINED OIL SEAL
Filed Nov. 9, 1929
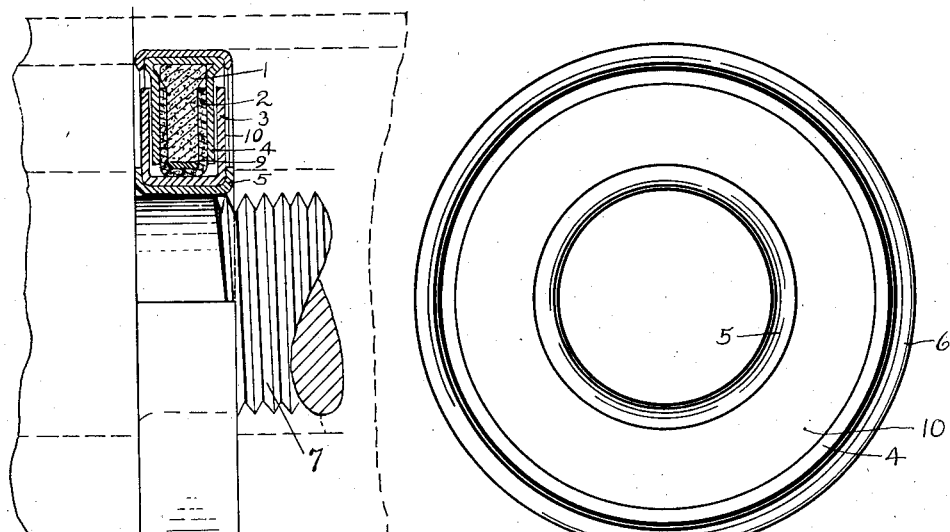
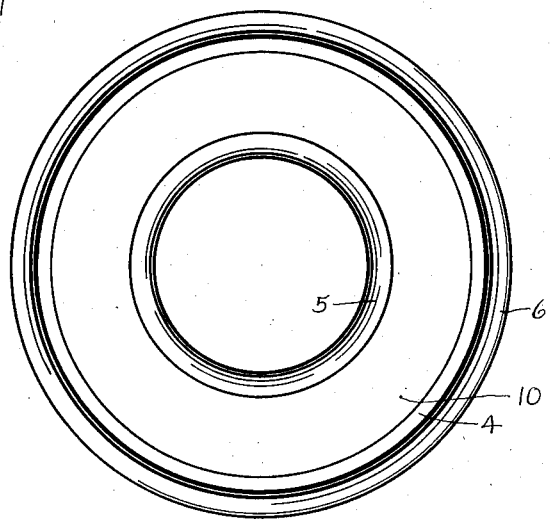
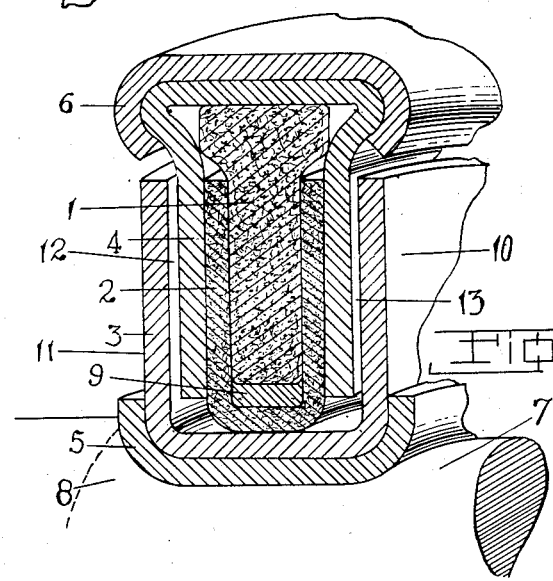
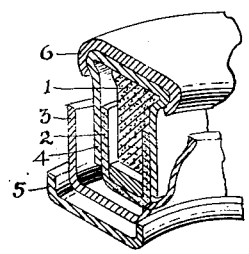
Elmer. A. Braden
INVENTOR.
BY A. B. McCall
ATTORNEYS.

Patented Mar. 15, 1932

1,849,359

UNITED STATES PATENT OFFICE

ELMER A. BRADEN, OF SPRINGFIELD, ILLINOIS

SELF CONTAINED OIL SEAL

Application filed November 9, 1929. Serial No. 406,146.

My invention relates to oil seals or packing rings for retaining oil about a bearing or boxing and the like; an object being in this device to provide a substantial, practical, and convenient as well as economical oil ring or oil seal.

A further object of my invention is to provide a self contained oil seal having an inner chamber of absorbent or fibrous oil containing material formed by annular cooperating channeled rings adapted to protect a bearing from oil losses and to protect the bearing also from foreign substances such as dirt or other substances or materials that would be injurious to a bearing or journal on which my device is adapted to operate.

A further object of my invention is to provide a practical device as a self contained oil seal which may be manufactured in a manner requiring no operations in the making that are either difficult or expensive; and in this case on the contrary requiring only operations that are capable of consistent and speedy production.

I attain the objects of my invention in the self contained oil seal described in the annexed specifications, recited in the claims and illustrated in the accompanying drawings in which like reference numerals indicate like parts in the several figures.

Referring to the figures:

Figure 1 is a side elevation of a portion of a journal and bearing of a type on which my self contained oil seal is adapted to normally operate. This figure shows a cross section of my oil seal with approximately one fourth part of the ring cut away.

Figure 2 is an enlarged detail cross section of the body of my self contained oil seal.

Figure 3 is a circular or end view of my invention.

Figure 4 is a perspective disclosing the details of construction of my oil seal.

Referring in detail to the construction of my oil seal and the preferred method of applying and using the same I provide an organization of parts formed so as to be operatively connected together in a manner to protect a journal boxing and bearing from the loss of oil when the journal is in normal use rotating in a bearing lubricated by oil.

My oil seal consists of a series of annular rings so connected as to permit an outer annular channel to turn upon an inner annular channel and have incased there between an absorbing ring of felt or the like and the combination engaged by a pair of spaced concentric annular clamps adapted to hold the channels in place.

The novel features of my invention include an annular ring of felt —1— or other absorbing material engaged by an annular U shaped channel of preferably leather —2— in casing felt —1—; and U shaped metallic annular channel members —3— and —4— which are respectively held in place by annular clamps —5— and —6—.

It will be observed that annular channel —4— is inverted and assembled so as to register within channel —3— so to permit channel —3— to freely but snugly rotate with a journal to which it may be engaged while channel —4— remains fixed in its snug fitting position against the journal bearing.

This movement could be reversed and when in normal use it may be occasionally operated in a manner requiring channel —4— to turn within channel —3— while channel —3— remains fixed on the journal, or shaft, or the like; this condition depending on whether the journal is the wheel or bearing supported thereby.

By observing Figure 2 it will be seen that clamp member —5— is adapted to snugly engage a journal —7— as it encompasses the same where it fits back against a shoulder or other stop member —8— of the journal. Clamp —5— in the manufacture of my invention firmly engages clamp —3—; while clamp —6— which is approximately the same width, substantially engages channel —4—.

It will be seen that ring —9— is a spring clamp ring adapted to resiliently engage leather bushing or channel member —2— to hold the same snugly against channel ring —3—; thus to close the space between the movable and stationary members of the oil seal.

Channel ring —4— is compressed from the sides to firmly engage felt member bearing without interfering in any respect with the normal movements of the same.

As shown in Figure 1 my oil seal device may be either firmly pressed on the journal by mechanical pressure or it may be operatively fitted thereto by means of a nut screwed to the journal so as to engage annular clamp —5—.

Thus it will be seen that my oil seal works effectively to keep the oil in and the dirt out.

For instance a novel merit in the construction of my oil seal is found in the fact that when rotating with journal —7— and with side —10— of channel ring —3— outside, and side —11— inside the actual tendency is for this channel ring to throw oil back in to the oil chamber rather than to let it get out through the space —12— between the moving channel ring —3— and the stationary channel ring —4—; where as by the same rotating movement any dirt or dust or other foreign matter will tend to be thrown off at the top of channel ring —3— to the outside because of the centrifugal action in the rotating channel ring thus tending to prevent such foreign matter from entering the space —13— between channel ring —3— and —4—.

It will thus be seen that my device serves a doubly helpful purpose in conserving oil by preventing losses thereof from journal bearings as well as to help keep the bearings clean and free from dirt.

Having thus described the nature of my invention what I claim is:

1. As a new article of manufacture a self contained oil seal comprising a pair of annular co-operating channeled rings, one fitting within the other face to face, forming an annular chamber; said chamber containing an oil containing substance, an inner compressible channeled ring engaging said substance, and an inner resilient band encompassing said compressible ring and holding said ring in contact with the inner of said channeled rings forming said chamber; and means for providing substantial engagement between said co-operating rings respectively adapted to engage a journal and a housing therefor and relatively rotate one within the other.

2. A self contained oil seal comprising in combination an annular absorbent ring, an inner and an outer channeled annular flanged ring, an inner leather ring engaging and compressing said absorbent ring so as to flank a major portion of the sides of the absorbent ring; said leather ring engaged by and compressed by said inner channeled annular flanged ring, a resilient spring encompassing said leather ring about its inner diameter and encompassed by said absorbent ring, and an inner and an outer supporting clamp respectively engaging said outer and inner channeled ring; said inner clamp adapted to engage a journal and said outer clamp adapted to engage the members supporting or supported by said journal.

3. As a new article of manufacture a self contained oil seal comprising an annular ring of absorbent material, an annular pad ring of U shape compressively and laterally engaging said absorbent material, an annular U shaped inverted metallic channel engaging and compressing said pad ring laterally, a second annular metallic U shaped channel ring forming a guide and guard flange beneath and on each side of said inverted channel engaging said pad ring and absorbent material, a resilient clamp ring engaging said pad ring to hold same in movable contact with said second U shaped channel ring; said resilient clamp ring disposed annularly between said absorbent ring and the base of said pad ring; an inner and an outer clamp member for engaging said oil seal channel rings; said inner clamp member adapted to rigidly engage said second U shaped channel ring and detachably engage a journal; and said outer clamp ring adapted to detachably engage the relatively stationary members supporting or supported by said journal.

In witness whereof I hereunto set my hand this 6th day of November, 1929.

ELMER A. BRADEN.